United States Patent
Andersen et al.

(10) Patent No.: US 9,239,072 B1
(45) Date of Patent: Jan. 19, 2016

(54) SECURE FASTENER ASSEMBLY

(71) Applicants: Trent Andersen, Fayetteville, AR (US); Kurt Kutz, Fayetteville, AR (US)

(72) Inventors: Trent Andersen, Fayetteville, AR (US); Kurt Kutz, Fayetteville, AR (US)

(73) Assignee: CAIRN5 LLC, Elkins, AR (US)

( * ) Notice: Subject to any disclaimer, the term of this patent is extended or adjusted under 35 U.S.C. 154(b) by 102 days.

(21) Appl. No.: 13/786,896

(22) Filed: Mar. 6, 2013

Related U.S. Application Data

(60) Provisional application No. 61/607,289, filed on Mar. 6, 2012.

(51) Int. Cl.
F16K 37/00 (2006.01)
F16K 31/60 (2006.01)
F16B 37/00 (2006.01)
F16K 5/06 (2006.01)

(52) U.S. Cl.
CPC . *F16B 37/00* (2013.01); *F16K 5/06* (2013.01); *F16K 31/602* (2013.01)

(58) Field of Classification Search
CPC ......... F16K 35/10; F16K 5/0657; F16K 5/06; F16K 31/602; F16B 37/00
USPC ........ 251/315.06; 137/315.41, 327, 328, 233, 137/381, 382, 15.08, 15.18, 15.22, 137/15.24–15.25, 315.17, 315.18, 315.22, 137/315.25
See application file for complete search history.

(56) References Cited

U.S. PATENT DOCUMENTS

| 2,893,259 | A | * | 7/1959 | Culleuder | 74/89.38 |
| 3,951,380 | A | * | 4/1976 | Oliva-Bonino | 251/304 |
| 4,302,137 | A | | 11/1981 | Hart | |
| 4,526,193 | A | * | 7/1985 | Drach | 137/296 |
| 4,690,167 | A | | 9/1987 | Skipper | |
| 4,784,555 | A | | 11/1988 | Cantrell | |
| 5,597,010 | A | * | 1/1997 | Hoffman et al. | 137/381 |
| 5,749,690 | A | | 5/1998 | Kutz | |
| 5,791,371 | A | * | 8/1998 | Kemp, II | 137/383 |
| 2005/0104026 | A1 | * | 5/2005 | Tulaskar | 251/315.01 |
| 2006/0237677 | A1 | * | 10/2006 | Williams et al. | 251/214 |
| 2010/0294968 | A1 | * | 11/2010 | Teague, Jr. | 251/304 |
| 2013/0186485 | A1 | * | 7/2013 | Schlesinger et al. | 137/382 |
| 2013/0221258 | A1 | * | 8/2013 | McCoy et al. | 251/315.1 |
| 2014/0026981 | A1 | * | 1/2014 | Bisio et al. | 137/315.18 |
| 2014/0216568 | A1 | * | 8/2014 | Roell | 137/15.18 |

* cited by examiner

*Primary Examiner* — Marina Tietjen
(74) *Attorney, Agent, or Firm* — Polsinelli PC

(57) ABSTRACT

A secure fastener assembly is described. The secure fastener assembly includes a flanged nut and a sleeve. The flanged nut includes a body portion and a flange portion. The sleeve includes an upper opening and a lower opening joined by a wall. The wall includes a shoulder in an inner surface of the wall near the upper opening. The shoulder receives the flange portion. A ball valve using the securing fastener assembly is also described.

23 Claims, 3 Drawing Sheets

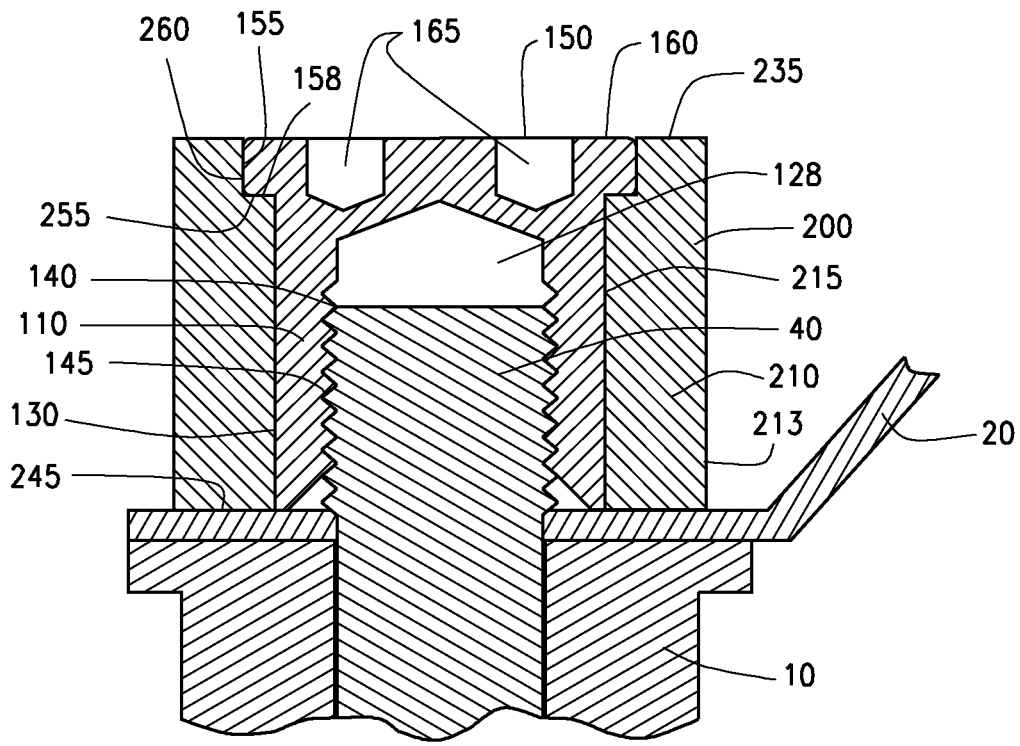
FIG. 3
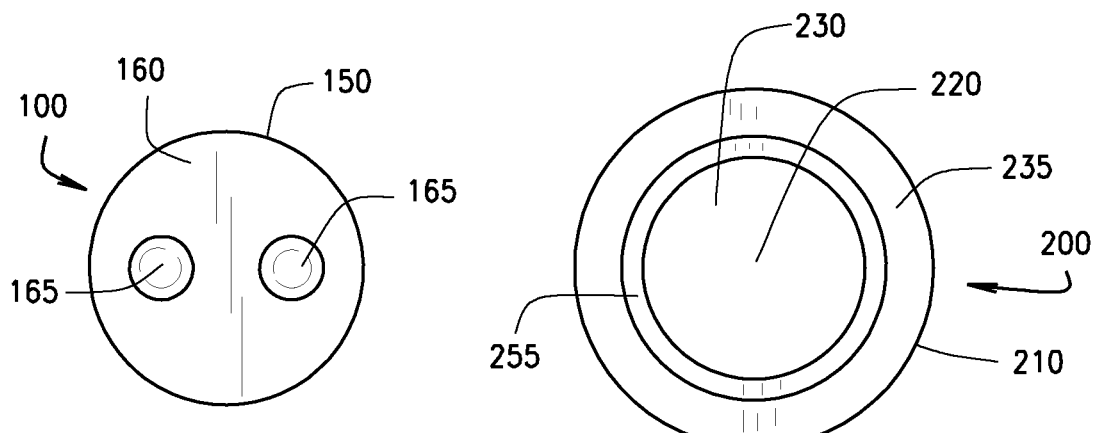
FIG. 4
FIG. 6

SECURE FASTENER ASSEMBLY

CROSS REFERENCE TO RELATED APPLICATION

This application is a Nonprovisional of Provisional Patent Application No. 61/607,289 filed Mar. 6, 2012, which is hereby incorporated by reference in its entirety.

FIELD OF INVENTION

The present invention relates to a secure fastener assembly.

BACKGROUND OF INVENTION

U.S. Pat. No. 5,749,690, invented by the present inventor, is hereby incorporated by reference. The '690 Patent describes a three piece, non-removable design for a nut and cap assembly that requires skill and practice for efficient installation. Further, the snap rings described in the '690 Patent are prone to bending upon installation, if the parts are not properly centered. Once the snap rings are bent, they cannot be used with the nut and cap. Stocking and supplying the assembly of the '690 Patent to consumers requires planning for the inevitable need for additional snap rings and the possibility of delaying customer orders until additional snap rings are made or received. Finally, the assembly of the '690 Patent is only removable by clamping down on the assembly with a vise or the like and deforming the assembly. After removal, the assemblies of the '690 cannot be used again.

SUMMARY

A secure fastener assembly is described. The secure fastener assembly includes a flanged nut and a sleeve. When the secure fastener assembly is installed, a portion of the outer exterior of the secure fastener assembly is freely rotatable. This makes the secure fastener assembly difficult to remove, as it is difficult to get a firm grip on the secure fastener assembly.

Once the secure fastener assembly is installed, it is difficult to remove without proper tools. However, if the technician has the proper tools, then the secure fastener assembly may be removed and reused. Absent the proper tools, it is nearly impossible to remove the secure fastener assembly without destruction of or damage to the secure fastener assembly.

The flanged nut includes a flange portion and a body portion. The sleeve has a generally cylindrical shape with a hollow central portion between two openings. The body portion of the flanged nut fits into the hollow central portion of the sleeve. The body portion of the flanged nut has a threaded interior that threadably engages a second threaded structure, such as a ball valve stem, screw, bolt, stud or other similar structure. As the threaded interior of the flanged nut threadably engages the second threaded structure, the flanged nut urges or seats the sleeve into a position about the second threaded structure. The sleeve fits loosely about the flanged nut.

The flanged nut includes a flange or other extending structure that engages a shoulder or other receiving structure or surface of the sleeve. This engagement between the flange and the shoulder holds the sleeve in place. The sleeve is held in a freely rotatable manner, which discourages tampering with the secure fastener assembly.

The secure fastener assembly provides for secure attachment to the ball valve stem, screw, bolt, stud or other similar structure. The secure fastener assembly may require the use of custom or proprietary drivers in order to fully tighten the flanged nut. The custom or proprietary drivers engage complementary fixture points on an upper surface of the flanged nut in order to rotate the flanged nut. Without the proper tools, the secure fastener assembly is difficult to remove without destroying it. With the proper tools, the secure fastener assembly may be easily non-destructively removed after it has been installed and reused.

In some aspects, the secure fastener assembly includes a two part design consisting of the flanged nut and sleeve. As only two parts form the secure fastener assembly, stocking costs are reduced. The secure fastener assembly requires less parts than the assembly of the '690 Patent and is easier to install, since the flanged nut is simply screwed to the threaded structure. No difficult alignment process is required.

In one aspect, a secure fastener assembly is described. The secure fastener assembly includes a flanged nut and a sleeve. The flanged nut includes a body portion and a flange portion. The sleeve includes an upper opening and a lower opening joined by a wall. The wall includes a shoulder in an inner surface of the wall near the upper opening. The shoulder receives the flange portion.

In another aspect, a secure fastener assembly is described. The secure fastener assembly includes a nut and a sleeve. The nut includes a body portion and an extending portion that extends from the body portion. The sleeve has a generally cylindrical shape. The sleeve includes an upper opening and a lower opening joined by a wall. The wall has an inner surface and an outer surface. The inner surface has a first inner diameter. A portion of the inner surface adjacent the upper opening has a second inner diameter. The second inner diameter is larger than the first inner diameter. The portion of the sleeve with the second inner diameter receives the extending portion.

In another aspect, a secure fastener assembly is described. The secure fastener assembly includes a flanged nut and a sleeve. The flanged nut includes a body portion and a flange portion. The sleeve includes an upper opening and a lower opening joined by a wall. The wall includes a receiving surface in the wall near the upper opening. The flange portion abuts against the receiving surface.

In another aspect, a method of installing a secure fastener assembly is described. The method includes providing a flanged nut. The flanged nut includes a body portion and a flange portion. The method includes providing a sleeve. The sleeve includes an upper opening and a lower opening joined by a wall. The wall includes a shoulder in an inner surface of the wall near the upper opening. The method includes inserting the body portion of the flanged nut into the upper opening of the sleeve. The method includes threading the body portion to a threaded engagement surface.

In another aspect, a ball valve is described. The ball valve includes an input port, an output port, a fluidic passage joining the input port and the output port, a valve to modulate flow of a fluid through the fluidic passage, a valve stem engaged to the valve, and the valve stem includes a threaded portion. The ball valve further includes a handle, and the valve stem passes through the handle. The ball valve further includes a flanged nut. The flanged nut includes a body portion and a flange portion. The ball valve further includes a sleeve. The sleeve includes an upper opening and a lower opening joined by a wall. The wall includes a shoulder in the wall near the upper opening. The shoulder receives the flange portion as the flanged nut is threaded to the threaded portion of the valve stem.

BRIEF DESCRIPTION OF DRAWINGS

FIG. 3 is a sectional view of the secure fastener assembly installed on the ball valve.

FIG. 4 is a top view of the flanged nut.

FIG. 6 is a bottom view of the sleeve.

DETAILED DESCRIPTION OF PREFFERRED EMBODIMENTS

Figure 1:
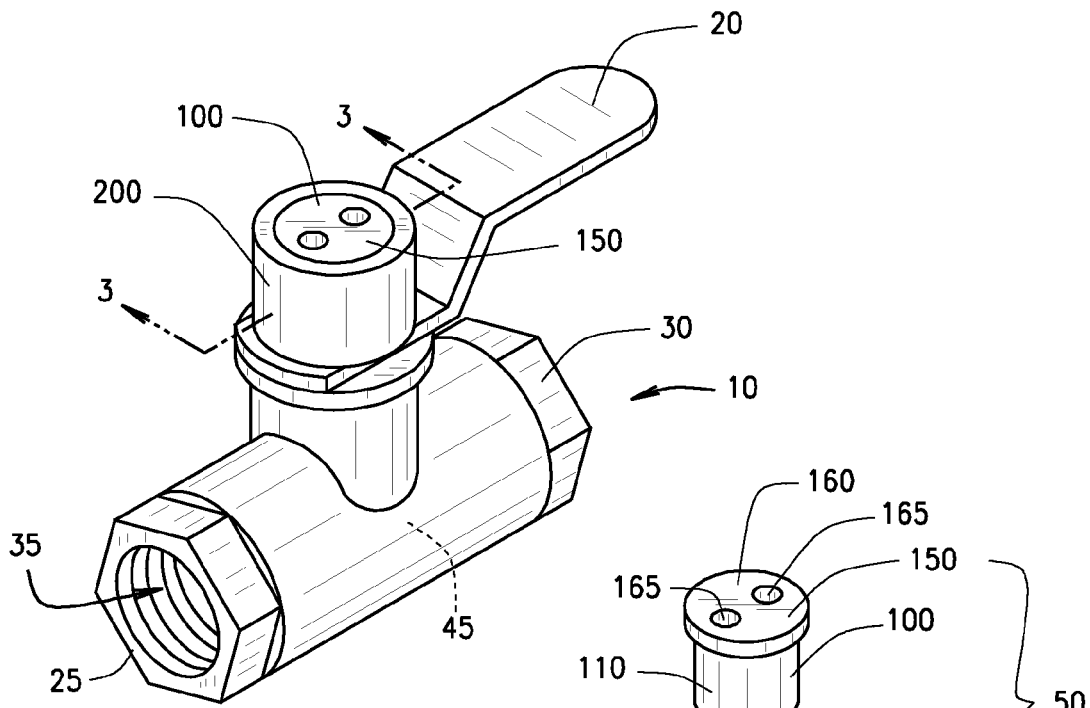
FIG. 1 is a perspective view of the secure fastener assembly installed on the ball valve.

A secure fastener assembly 50 is shown in FIGS. 1-8. The secure fastener assembly 50 includes a flanged nut 100 and a sleeve 200. In FIGS. 1-3 and 8, the secure fastener assembly 50 is shown with a ball valve 10. The secure fastener assembly 50 securely holds a ball valve handle 20 to the ball valve 10.

The flanged nut 100 includes a body portion 110 and a flange portion 150. The body portion 110 has a generally cylindrical shape formed by a body wall 120. The body wall 120 has an outer surface 130 and an inner surface 140. The body portion 110 has a lower opening 125 leading to a generally hollow interior or cavity 128. The inner surface 140 of the body portion 110 further includes a threaded engagement surface 145 adjacent or toward the lower opening 125. The threaded engagement surface 145 threadably engages to a second threaded structure, such as the ball valve stem 40 shown in FIGS. 1-3 and 8. In other aspects, the second threaded structure may include screws, bolt, studs or other similar threaded structures.

The flange portion 150 has a larger outer diameter than the body portion 110. The flange portion extends 150 radially from the body portion 110. The flange portion 150 may alternatively include a lip, protrusions, extensions, etc. that extend from the body portion 110. The flange portion 150 includes an upper surface 160. The upper surface 160 includes one or more tool receiving points 165, such as for example, holes, openings, indentations, etc. that receive a tool. As shown in FIG. 4, the upper surface 160 includes two of the tool receiving ports 165.

The sleeve 200 includes a generally cylindrical shape formed by a sleeve wall 210. The sleeve wall 210 has a generally smooth outer surface 213 and an inner surface 215. The sleeve wall 210 has a generally open interior 220 that receives the body portion 110 of the flanged nut 100. The open interior 220 of the sleeve 200 has a diameter just larger than an outer diameter of the body portion 110. This allows the sleeve 200 to spin or rotate about the flanged nut 100. As can be seen in the FIGS., the sleeve 200 does not necessarily completely cover the flanged nut 100. The cover 200 may partially cover the flanged nut 100.

The sleeve 200 includes an upper opening 230 and a lower opening 240. The sleeve wall 210 extends between the upper opening 230 and the lower opening 240. The sleeve 200 includes a sleeve lower surface 245 adjacent to the lower opening 240.

The sleeve 200 includes a shoulder 250 at or near the upper opening 230. The shoulder 250 includes a shoulder lower surface 255 and a shoulder side surface 260. The shoulder lower surface 255 forms a ledge or stopping structure that receives the flange portion 150 of the flanged nut 100. The flange portion 150 of the flanged nut 100 abuts the shoulder 250. In this aspect, the shoulder side surface 260 has a larger inner diameter than an inner diameter formed by the inner surface 215 of the sleeve 200. As such, the inside surface of the sleeve 200 may include multiple different inner diameters.

As shown in FIG. 3, the shoulder lower surface 255 is approximately perpendicular to the shoulder side surface 260. In other aspects, the shoulder portion 250 and the flange portion 150 could be formed with a rounded, irregular, or other shapes with different angles.

The flange portion 150 includes a flange outer surface 155 and a flange lower surface 158. When the flanged nut 100 is fully seated in the sleeve 200, the flange lower surface 158 abuts and is flush against the shoulder lower surface 255 and the flange outer surface 155 is flush against the shoulder side surface 260. The shoulder side surface 260 has an internal diameter just larger than an external diameter of the flange outer surface 155.

The shoulder 250 has a depth approximately equal to the depth of the flange portion 150. As such, the upper surface 160 of the flange portion 150 is approximately level or flush with the top surface 235 of the upper opening 230 of the sleeve 200. Similarly, the flange outer surface 155 has approximately the same depth as the shoulder side surface 260.

Figure 2:
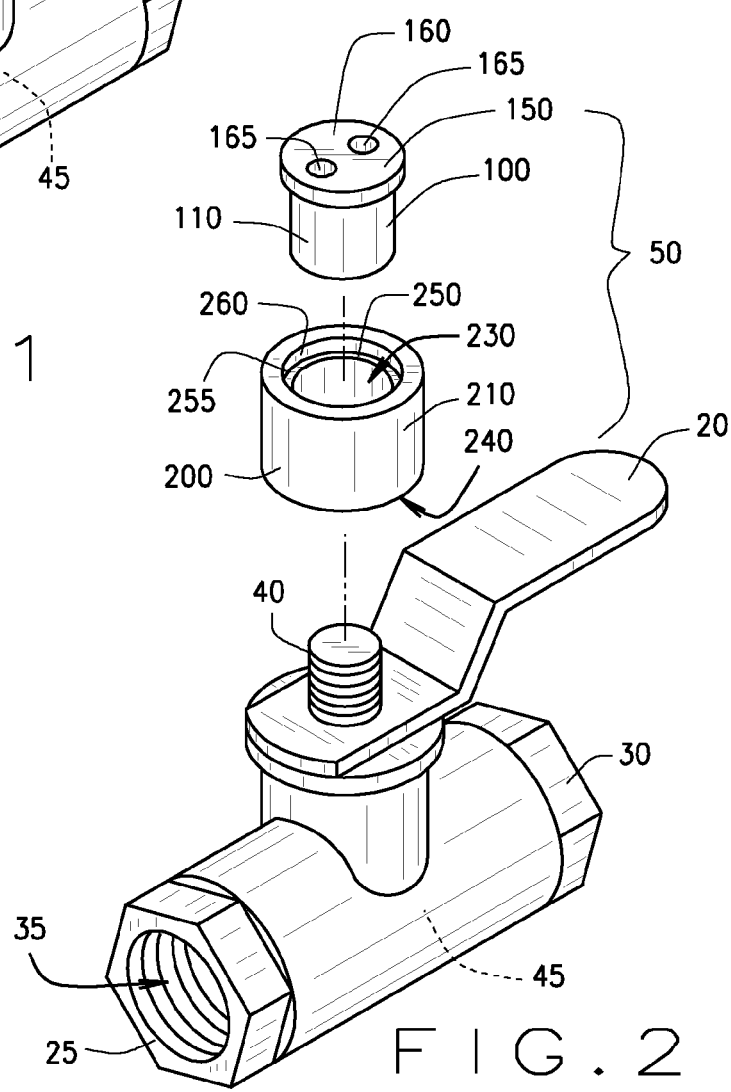
FIG. 2 is an exploded view of the secure fastener assembly installed on the ball valve.
Figure 5:
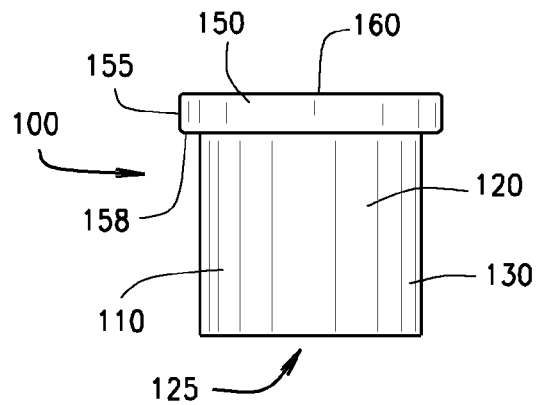
FIG. 5 is a side view of the flanged nut.
Figure 7:
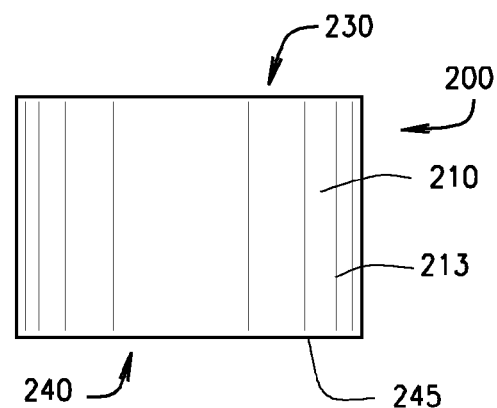
FIG. 7 is a top view of the sleeve.

An exploded view of the secure fastener assembly 50 and the ball valve 10 is shown in FIG. 2. The body portion 110 of the flanged nut 100 inserts through the upper opening 230 of the sleeve 200, and the body portion 110 passes into the interior 220 of the sleeve 200. Next, a threaded valve stem 40 of the valve 10 inserts into the lower opening 125 of the body portion 110 of the flanged nut 100. An amount of LOCTITE or other adhesive may be optionally placed on one or both of the threaded engagement surface 145 and the threaded valve stem 40 to help secure the two surfaces together. The threaded engagement surface 145 of the body portion 110 threadably receives the threaded valve stem 40. As the body portion 110 of the flanged nut 100 threads to the threaded valve stem 40, the body portion 110 draws in or seats the sleeve 200. This occurs as the flange portion 150 catches against the shoulder 250.

When the body portion 110 is fully threaded or tightened to the threaded valve stem 40, the upper surface 160 of the flange portion 120 is approximately level or flush with the top surface 235 of the upper opening 230 of the sleeve 200. FIG. 1 shows a view of the fully tightened or threaded engagement. When the body portion 110 is fully threaded to the threaded valve stem 40, the sleeve 200 still easily rotates or spins relative to the flanged nut 100 without backing off the threaded engagement between the threaded engagement surface 145 of the body portion 110 and the threaded valve stem 40. The lower surface 245 of the sleeve 200 may contact the ball valve 10 or its handle 20 so long as the sleeve 200 still freely or easily rotates or spins. This may be accomplished by limiting the lengths of the threads on the threaded engagement surface 145 of the body portion 110 and/or the threaded valve stem 40.

The lower surface 245 of the sleeve 200 may rest on or contact the ball valve 10 or its handle 20. This will allow the sleeve 200 to still rotate. The lower surface 245 of the sleeve 200 should generally not be forced strongly or tightened tightly against the ball valve 10 or its handle 20. Otherwise, such a strong or tight contact between the lower surface 245 and the ball valve 10 or its handle 20 may interfere with the freely rotating sleeve 200.

Figure 8:
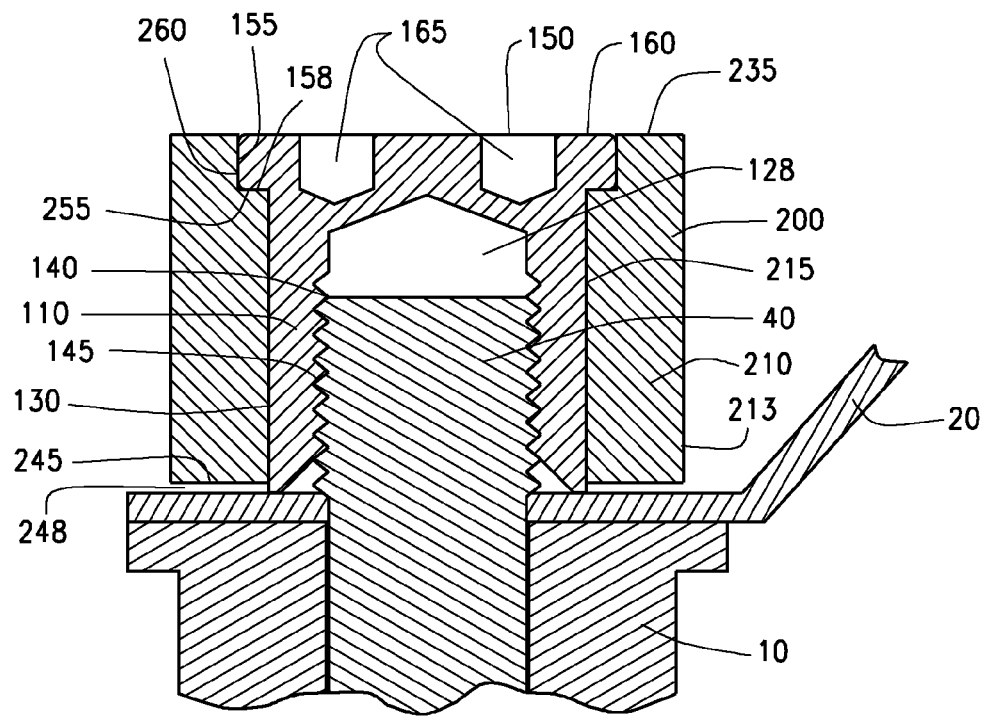
FIG. 8 is a sectional view of the secure fastener assembly installed on the ball valve.

In other aspects, the overall length of the sleeve 200 may be just shorter than the overall length of the flanged nut 100. As shown in FIG. 8, a gap or space 248 may be formed between the lower surface 245 and a surface of the ball valve 10 or its handle 20. The gap 248 may be reduced or increased in size.

When the secure fastener assembly 50 is installed, the sleeve 200 is freely rotatable. This makes the secure fastener assembly 50 difficult to remove, since the only exterior surfaces of the secure fastener assembly 50 that are parallel to the axis of rotation of the flanged nut 100 are the walls of the sleeve 200, which are freely rotatable.

The upper surface 160 includes the one more tool receiving points 165, which as shown in FIG. 2, are designed to be used with a SPANNER wrench. As such, the flanged nut 100 can only normally be loosened with the use of a SPANNER wrench. Although the use of tool receiving points 165 configured to operate with a SPANNER wrench are herein described, other proprietary or custom tools and design for the receiving points 165 may be utilized. By avoiding the use of conventional tool fixtures, such as a Phillips, allen, or star, the security of the secure fastener assembly 50 is improved. In order to remove the secure fastener assembly 50, either a SPANNER wrench or a destructive technique is required to remove the flanged nut 100. In typical industrial settings, most parties seeking to remove the secure fastener assembly 50, without proper authorization, will not have a SPANNER wrench convenient and will not want to destructively remove the secure fastener assembly 50. In order to properly remove the secure fastener assembly 50, the assembly 50 may be heated with a blow torch or the like to loosen the LOCTITE. Then, the SPANNER wrench is used to engage the receiving points 165 to rotate the flanged nut 100 from the sleeve 200.

The flanged nut 100 and the sleeve 200 may be made from metal and metal alloys, such as stainless steel. The relative size of the flanged nut 100 and the sleeve 200 may be scaled up and down for use in a variety of applications. Further, the threaded engagement surface 145 of the flanged nut 100 may vary in size and dimension depending on the particular object receiving the flanged nut 100.

As shown in FIGS. 1-3 and 8, the secure fastener assembly 50 may be used with the ball valve 10. The ball valve includes an input port 25, an output port 30, and a fluidic passage 35 joining the input port 25 and the output port 30. A valve 45 modulates the flow of a fluid through the fluidic passage 35. The threaded valve stem 40 is engaged to the valve 45. The flanged nut 100 passes through the sleeve 200 and threads to the threaded valve stem 40, which secures the sleeve 200 to the flanged nut 100 and the ball valve 10.

Those skilled in the art will appreciate that variations from the specific embodiments disclosed above are contemplated by the invention. The invention should not be restricted to the above embodiments, but should be measured by the following claims.

What is claimed is:

1. A secure fastener assembly, comprising:
a flanged nut, the flanged nut including a body portion and a flange portion;
a sleeve, the sleeve including an upper opening and a lower opening joined by a wall, the wall including a shoulder in an inner surface of the wall near the upper opening; and,
wherein the shoulder receives the flange portion; and,
wherein the body portion of the flange nut threads to or tightens against a threaded stem of a ball valve.

2. The secure fastener assembly according to claim 1, wherein the flange portion of the flanged nut has a larger outer diameter than the body portion of the flanged nut.

3. The secure fastener assembly according to claim 1, wherein the flange portion extends radially from the body portion.

4. The secure fastener assembly according to claim 1, wherein the body portion inserts through the upper opening of the sleeve.

5. The secure fastener assembly according to claim 1, wherein the shoulder includes a shoulder side surface and a shoulder lower surface.

6. The secure fastener assembly according to claim 5, wherein the flange portion includes a flange lower surface and a flange outer surface, wherein the flanged nut seats in the sleeve, and the flange lower surface abuts against the shoulder lower surface, and the flange outer surface is flush against the shoulder side surface.

7. The secure fastener assembly according to claim 6, wherein the shoulder side surface has an internal diameter just larger than an external diameter of the flange outer surface.

8. The secure fastener assembly according to claim 1, wherein an upper surface of the flange portion is approximately level or flush with a top surface of the upper opening of the sleeve when the body portion is fully threaded or fully tightened to the threaded stem of the ball valve.

9. The secure fastener assembly according to claim 1, wherein the sleeve is freely rotatable.

10. The secure fastener assembly according to claim 1, wherein the secure fastener assembly is non-destructively removable.

11. The secure fastener assembly according to claim 1, wherein the secure fastener assembly is removed and reused.

12. The secure fastener assembly according to claim 1, wherein the flanged nut and the sleeve are the only components of the secure fastener assembly.

13. The secure fastener assembly according to claim 1, wherein an upper surface of the flanged nut includes one or more tool receiving points.

14. The secure fastener assembly according to claim 13, wherein the one or more tool receiving points work with a non-typical or custom tool.

15. The secure fastener assembly according to claim 14, wherein the one or more tool receiving points work with a SPANNER wrench.

16. A valve assembly, comprising:
an input port;
an output port;
a fluidic passage joining the input port and the output port;
a valve to modulate flow of a fluid through the fluidic passage;
a valve stem engaged to the valve;
a handle, wherein the valve stem passes through the handle;
a nut, the nut including a body portion and an extending portion that extends from the body portion;
a sleeve having a generally cylindrical shape, the sleeve including an upper opening and a lower opening joined by a wall, the wall having an inner surface and an outer surface, the inner surface having a first inner diameter, wherein a portion of the inner surface adjacent the upper opening has a second inner diameter, wherein the second inner diameter is larger than the first inner diameter; and,
wherein the portion of the sleeve with the second inner diameter receives the extending portion, and the body engages to the valve stem.

17. A valve assembly, comprising:
an input port;
an output port;
a fluidic passage joining the input port and the output port;
a valve to modulate flow of a fluid through the fluidic passage;
a valve stem engaged to the valve to control the valve;
a handle, wherein the valve stem passes through the handle;
a flanged nut, the flanged nut including a body portion and a flange portion;

a sleeve, the sleeve including an upper opening and a lower opening joined by a wall, the wall including a shoulder in an inner surface of the wall near the upper opening; and, wherein the shoulder receives the flange portion; and wherein the body portion of the flanged nut tightens to the valve stem.

18. A valve assembly, comprising:

a valve to modulate flow of a fluid through a fluidic passage of the valve;

a valve stem engaged to the valve to control the valve;

a handle, wherein the valve stem passes through the handle;

a flanged nut, the flanged nut including a body portion and a flange portion;

a sleeve, the sleeve including an upper opening and a lower opening joined by a wall, the wall including a receiving surface in the wall near the upper opening; and, wherein the flange portion abuts against the receiving surface; and, wherein the body portion of the flanged nut engages to the valve stem.

19. A method of installing a secure fastener assembly, comprising:

providing a flanged nut, the flanged nut including a body portion and a flange portion;

providing a sleeve, the sleeve including an upper opening and a lower opening joined by a wall, the wall including a shoulder in an inner surface of the wall near the upper opening; and, inserting the body portion of the flanged nut into the upper opening of the sleeve; and threading the body portion to a threaded engagement surface of a stem of a ball valve.

20. The method according to claim 19, further comprising catching the flange portion against the shoulder.

21. The method according to claim 20, further comprising non-destructively removing the flanged nut and the sleeve from the valve stem.

22. A ball valve, comprising:

an input port;

an output port;

a fluidic passage joining the input port and the output port;

a valve to modulate flow of a fluid through the fluidic passage;

a valve stem engaged to the valve, wherein the valve stem includes a threaded portion;

a handle, wherein the valve stem passes through the handle;

a flanged nut, the flanged nut including a body portion and a flange portion;

a sleeve, the sleeve including an upper opening and a lower opening joined by a wall, the wall including a shoulder in the wall near the upper opening; and, wherein the shoulder receives the flange portion as the flanged nut is threaded to the threaded portion of the valve stem.

23. The ball valve according to claim 22, wherein the flanged nut is removed by unscrewing the flanged nut.

\* \* \* \* \*